United States Patent
Wallner

(10) Patent No.: US 6,535,800 B2
(45) Date of Patent: Mar. 18, 2003

(54) VEHICLE ROLLOVER SENSING USING ANGULAR RATE SENSORS

(75) Inventor: Edward J Wallner, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/865,810

(22) Filed: May 29, 2001

(65) Prior Publication Data

US 2002/0183899 A1 Dec. 5, 2002

(51) Int. Cl.$^7$ .............................. G05D 1/00; G06F 7/00
(52) U.S. Cl. ................... 701/1; 701/36; 701/45; 280/735; 280/756
(58) Field of Search .................. 701/1, 36, 45, 701/46; 280/5.501, 5.502, 5.514, 5.507, 756, 735; 180/282; 340/429, 438; 73/504.02, 504.03

(56) References Cited

U.S. PATENT DOCUMENTS

| | | | |
|---|---|---|---|
| 5,610,575 A | 3/1997 | Gioutsos | 340/429 |
| 5,825,284 A | 10/1998 | Dunwoody et al. | 340/440 |
| 5,835,873 A | 11/1998 | Darby et al. | 701/45 |
| 5,890,084 A | 3/1999 | Halasz et al. | 701/45 |
| 6,002,974 A | 12/1999 | Schiffman | 701/36 |
| 6,002,975 A | 12/1999 | Schiffmann et al. | 701/36 |
| 6,038,495 A | 3/2000 | Schiffmann | 701/1 |
| 6,182,783 B1 * | 2/2001 | Bayley | 180/271 |
| 6,212,455 B1 * | 4/2001 | Weaver | 180/282 |
| 6,301,536 B1 * | 10/2001 | Vaessen et al. | 701/45 |

FOREIGN PATENT DOCUMENTS

| | | |
|---|---|---|
| DE | 19606043 | 8/1997 |
| DE | 19609176 | 9/1997 |
| DE | 19609717 | 9/1997 |
| EP | 306003 | 3/1989 |

OTHER PUBLICATIONS

"A Dual–Axis Tilt Sensor Based on Micromachined Accelerometers," Mike Horton, Charles Kitchin, Sensors, Apr. 1996, pp. 91–94.
"Roll Over Detection," Steiner, Weidel, Kublbeck, Steurer, SAE Technical Paper Series, Feb. 24–27, 1997, pp. 45–49.
"Problems of Using Accelerometers to Measure Angular Rate in Automobiles," P.E. M. Frere, Sensors and Actuators A. 25–27, 1991, pp. 821–824.
Ward's Auto World, Natalie Neff, Nov. 1996, p. 74.
Massachusetts Inst. Of Tech. Kalman Filter Estimation of Underwater Vehicle Position and Attitude, Sep. 1994, p. 106.

* cited by examiner

Primary Examiner—Jacques H. Louis-Jacques
(74) Attorney, Agent, or Firm—Robert M. Sigler

(57) ABSTRACT

A vehicle rollover sensor is provided for detecting an anticipated overturn condition of a vehicle. The rollover sensor includes a first angular rate sensor sensing attitude rate of change of a vehicle about a first axis and producing a first attitude rate of change signal. Also included is a second angular rate sensor sensing attitude rate of change of the vehicle about a second axis and producing a second attitude rate of change signal. The first and second angular rate sensors are located on a vehicle and arranged so that the first axis is different from the second axis. The rollover sensor further includes a rollover discrimination controller for determining a vehicle overturn condition based on the first and second sensed attitude rate of change signals. In addition, roll arming logic generates a roll arming signal based on the first and second sensed attitude rate of change signals.

27 Claims, 5 Drawing Sheets

VEHICLE ROLLOVER SENSING USING ANGULAR RATE SENSORS

TECHNICAL FIELD

The present invention generally relates to rollover sensors and, more particularly, to vehicle rollover sensing with minimal sensor hardware for sensing a rollover condition of a vehicle.

BACKGROUND OF THE INVENTION

Automotive manufacturers are increasingly equipping vehicles with safety-related devices that deploy in the event that the vehicle experiences a rollover so as to provide added protection to the occupants of the vehicle. For example, upon detecting a vehicle rollover event, a pop-up roll bar can be deployed such that, when activated, the roll bar further extends vertically outward to increase the height of support provided by the roll bar during the rollover event. Other controllable devices may include the deployment of one or more air bags, such as frontal air bags, side mounted air bags, and roof rail air bags, or actuating a pretensioner to pretension a restraining device, such as a seatbelt or safety harness, to prevent occupants of the vehicle from ejecting from the vehicle or colliding with the roof of the vehicle during a rollover event.

Mechanical-based rollover sensors have been employed in automotive vehicles to measure the angular position of the vehicle exceeding a predetermined threshold from which a rollover event can be determined. The mechanical sensors typically have included the use of a pendulum normally suspended vertically downward due to the Earth's gravitational force. Many mechanical automotive sensing devices have been employed simply to monitor the angular position of the vehicle relative to a horizontal level ground position which is generally perpendicular to the gravitational force vector. As a consequence, such mechanical automotive sensors have generally been susceptible to error when the vehicle travels around a corner or becomes airborne, in which case the Earth's gravitational force, which the sensor relies upon, may be overcome by dynamic forces.

More sophisticated rollover sensing approaches generally require the use of as many as six sensors including three accelerometers and three angular rate sensors, also referred to as gyros, and a microprocessor for processing the sensed signals. The three accelerometers typically provide lateral, longitudinal, and vertical acceleration measurements of the vehicle, while the three gyros measure angular pitch rate, roll rate, and yaw rate. Such sophisticated rollover sensing approaches generally require a large number of sensors which add to the cost and complexity of the overall system. In addition, known sophisticated systems are generally susceptible to cumulative drift errors.

Some rollover sensing approaches have attempted to minimize the number of sensors required for rollover detection. For rollover sensing about a single axis, some traditional sensing approaches employ a combination of three or four individual sensors, depending upon the rollover algorithm employed. Other sensing approaches have attempted to employ, at a minimum, both an angular rate sensor and an accelerometer, either in the lateral axis or vertical axis. While the angular rate sensor output can ideally be integrated over time to estimate the vehicle roll angle, in practice, such sensors typically have a non-zero, time-varying output, even when no roll rate is present. This sensor bias may cause a significant error in the integrated roll angle, and therefore the sensed signals must be compensated to remove the error. Accelerometers are often used to provide such compensation; however, automotive-grade low-G accelerometers are generally expensive, and accelerometer bias and offset errors also need to be compensated for, possibly by some costly means of calibration during the manufacturing process.

Accordingly, it is desirable to provide for an accurate and timely rollover sensing approach that minimizes the number of sensors that are required to detect rollover of a vehicle. More particularly, it is desirable to provide for a rollover detection approach that allows for use of angular rate sensors, without requiring auxiliary sensors in addition thereto. It is further desirable to provide for such a rollover sensing approach that eliminates the need for low-G accelerometers.

SUMMARY OF THE INVENTION

In accordance with the teachings of the present invention, a vehicle rollover sensor and method are provided for detecting an anticipated overturn condition of a vehicle, thus allowing for timely deployment of safety-related devices. The rollover sensor includes a first angular rate sensor for sensing attitude rate of change of a vehicle about a first axis and producing a first attitude rate of change signal indicative thereof. Also included is a second angular rate sensor for sensing attitude rate of change of the vehicle about a second axis and producing a second attitude rate of change signal indicative thereof. The first and second angular rate sensors are located on the vehicle and arranged so that the first axis is different from the second axis. The rollover sensor further includes a rollover discrimination controller for determining a vehicle overturn condition based on the first and second sensed attitude rate of change signals and providing an output signal indicative thereof.

According to another aspect of the present invention, the rollover sensor includes a first angular rate sensor for sensing a first attitude rate of change of a vehicle and producing a first attitude rate of change signal, and a second angular rate sensor for sensing a second attitude rate of change of the vehicle and producing a second attitude rate of change signal. Rollover arming logic receives the first and second attitude rate of change signals and generates a roll arming signal as a function of the first and second attitude rate of change signals. A rollover discrimination controller generates a vehicle overturn condition signal as a function of the first and second attitude angles and the rollover arming signal.

According to a further aspect of the present invention, a method is provided for detecting an anticipated overturn condition of a vehicle. The method includes the steps of sensing attitude rate of change of a vehicle about a first axis and producing a first attitude rate of change signal indicative thereof, and sensing attitude rate of change of the vehicle about a second axis and producing a second attitude rate of change signal indicative thereof, wherein the first axis is different from the second axis. The method further includes the step of determining a vehicle overturn condition based on the first and second sensed attitude rate of change signals. According to yet a further aspect of the present invention, the method includes a step of determining a roll arming signal based on the first and second sensed attitude rate of change signals, wherein the vehicle overturn condition is determined further as a function of the roll arming signal.

Accordingly, the rollover sensor and method of the present invention advantageously minimizes the number of sensors that are required to arm and discriminate an overturn (rollover and/or pitchover) condition of a vehicle. It should be appreciated that the rollover sensor and method employ first and second angular rate sensors, without requiring other auxiliary sensors, to achieve cost-efficient and accurate vehicle rollover detection.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
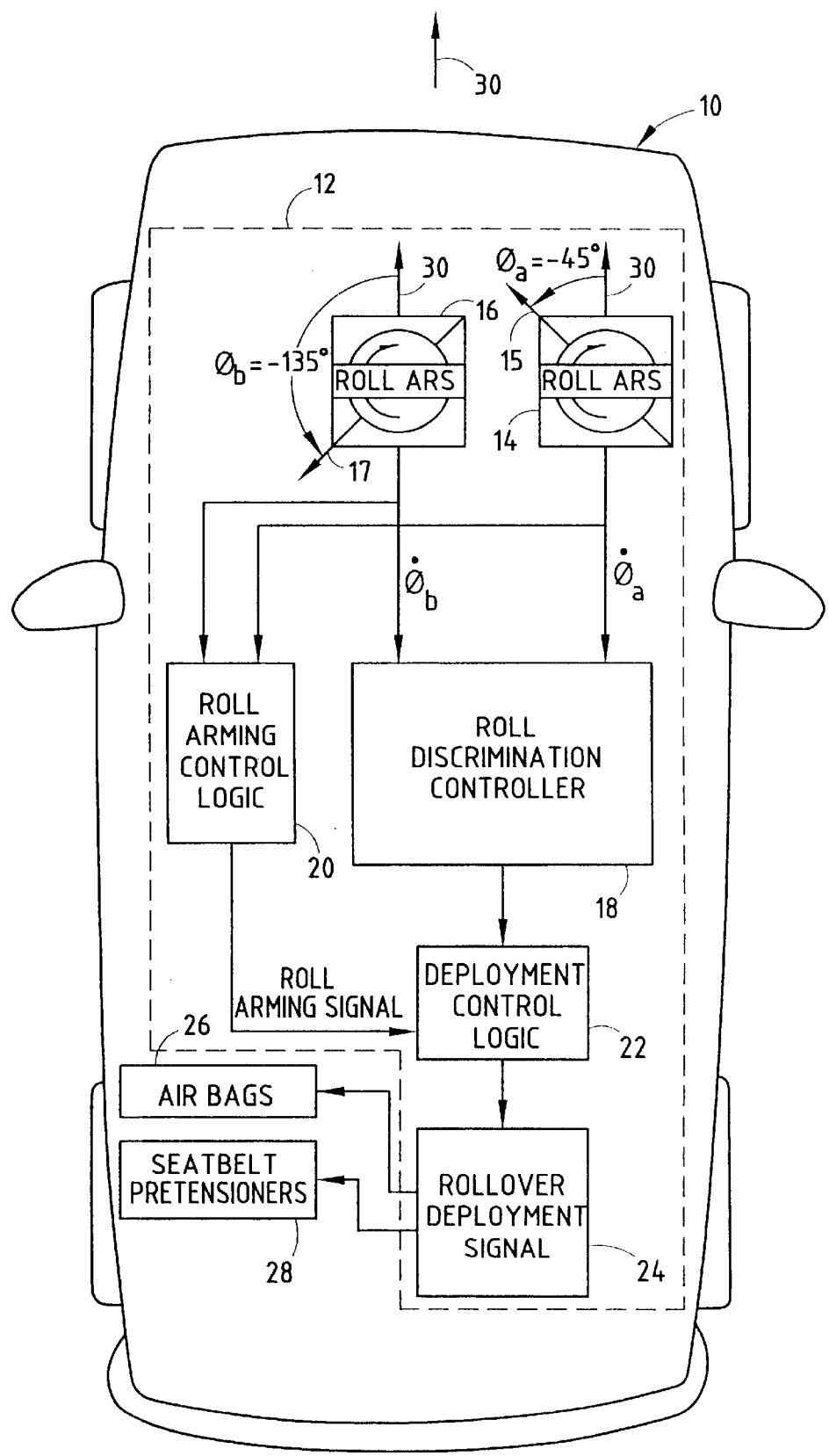
FIG. 1 is a block diagram of a vehicle equipped with a rollover sensor for detecting rollover of the vehicle according to the present invention.

Referring to FIG. 1, a vehicle 10 is generally shown equipped with a rollover sensor 12 for detecting an anticipated overturn condition, such as a rollover event of the vehicle, according to the present invention. The rollover sensor 12 of the present invention is preferably mounted on the automotive vehicle 10 and detects, in advance, an impending rollover event (condition) of the vehicle 10. A vehicle rollover condition, as described herein in connection with the present invention, may include side-to-side rotation of the vehicle about a longitudinal axis 30 of the vehicle 10, commonly referred to as a "vehicle rollover," or back-to-front rotation about the lateral axis (which is orthogonal to the longitudinal axis 30) of the vehicle 10, commonly referred to as a "vehicle pitchover," or a combination of rollover and pitchover. For purposes of describing the rollover sensing of the present invention, the term "rollover" is generally used to refer to either a rollover condition or a pitchover condition.

The rollover sensor 12 is designed to be located on the automotive vehicle 10 to sense vehicle dynamics, particularly roll angular rate of change, and to detect a rollover condition of the vehicle 10 based on the sensed angular rate of change signals. Upon detecting a vehicle rollover condition, the rollover sensor 12 generates a rollover deployment output signal 24 indicative of the detected rollover condition. The rollover deployment output signal 24 may be supplied to one or more selected vehicle devices, such as safety-related devices, to deploy the device(s) in anticipation of an upcoming rollover event. For example, the detected rollover condition output signal 24 may be employed to deploy one or more front, side, or roof-rail (side curtain) deployment air bags 26 to reduce potential injury to the vehicle occupants during a vehicle rollover. Similarly, the rollover deployment output signal 24 may be used to actuate an occupant restraining device, such as a harness or seatbelt safety pretensioner 28, to eliminate slack in the restraining device just prior to the vehicle rollover event occurring. Other deployable features include deployment of a pop-up roll bar to provide extended vertical clearance to the occupants of the vehicle when the vehicle experiences a rollover. These and other devices may be controlled in response to the rollover deployment output signal 24.

The rollover sensor 12 includes two angular rate sensors (ARS), namely a first angular rate sensor 14 and a second angular rate sensor 16, each preferably oriented as described herein to perform the intended sensing operation. The first and second angular rate sensors 14 and 16, respectively, are shown and described herein in an orientation for use in detecting vehicle rollover about the longitudinal axis 30 of vehicle 10. The first and second angular rate sensors 14 and 16 may include commercially available sensors, such as vibrating tuning fork type sensors having Part No. EWTS62NB21, commercially available from Panasonic. It should be appreciated that various other types of angular rate sensors may be employed in accordance with the teachings of the present invention.

According to the embodiment shown and described herein, the first angular rate sensor 14 is oriented at an angle $\theta_a$ of about minus forty-five degrees ($-45°$ (counterclockwise)) relative to the forward longitudinal axis 30 of the vehicle 10. Thus, first rate sensor 14 senses the time rate of change of angular roll about the minus forty-five degree ($-45°$) first axis 15, and generates a first attitude (e.g., roll) rate of change signal $\dot{\theta}_a$ indicative thereof. The second angular rate sensor 16 is oriented at an angle $\theta_b$ of about minus one hundred thirty-five degrees ($-135°$ (counterclockwise)) relative to the forward longitudinal axis 30 of vehicle 10. Thus, second rate sensor 16 senses the time rate of change of angular roll about the minus one hundred thirty-five degree ($-135°$) second axis 17 and generates a second attitude (e.g., roll) rate of change signal $\dot{\theta}_b$ indicative thereof.

Each of the first and second angular rate sensors 14 and 16, respectively, senses the time rate of change of angular roll about an angle $\theta_a$ or $\theta_b$ angularly rotated from the roll angle about the longitudinal axis 30. Instead of sensing angular roll rate of change exactly about the roll angle, each of first and second angular rate sensors 14 and 16 senses a roll vector component that is processed and used to determine an anticipated rollover event of the vehicle 10. It should be appreciated that the present invention advantageously requires only two angular rate sensors 14 and 16 to determine either a rollover event or pitchover event of the vehicle, without requiring auxiliary sensors as is generally required in known conventional rollover sensing approaches. It should also be appreciated that both rollover and pitchover events may be detected by either by revising the arming scheme and/or employing an additional angular rate sensors oriented to sense angular rate about the lateral axis of, the vehicle.

The rollover sensor 12 also includes a roll discrimination controller 18 for processing the first and second sensed angular rate signals $\dot{\theta}_a$ and $\dot{\theta}_b$, respectively, and determining an anticipated rollover event. The roll discrimination controller 18 is preferably a microprocessor-based controller. One example of roll discrimination controller 18 is Model No. 68HC, made available by Motorola. Associated with controller 18 is memory, such as an electronically erasable programmable read-only memory (EEPROM) (not shown), that stores various program calibrations for performing the rollover detection algorithm as is explained herein. The memory can be integrated into the roll discrimination controller 18 or provided external thereto.

Additionally, the rollover sensor 12 includes roll arming control logic 20 for receiving the first and second sensed angular rate signals $\dot{\theta}_a$ and $\dot{\theta}_b$ and generating a roll arming signal. The roll arming signal serves as a redundancy check prior to deploying devices during a rollover event. It should be appreciated that the first and second angular rate sensors 14 and 16, respectively, are employed for both determining an anticipated rollover event and generating the roll arming signal, according to the present invention.

The rollover sensor 12 further includes deployment control logic 22 for generating a rollover deployment output signal 24 as a function of the outputs of roll discrimination controller 18 and roll arming control logic 20. The rollover deployment output signal 24 is used to deploy safety-related devices such as air bags 26 and seatbelt pretensioners 28, as well as other devices. The rollover deployment signal 24 is generated in anticipation of an upcoming rollover event and is preferably used to activate the safety-related device(s) just prior to the actual rollover event occurring.

Figure 2:
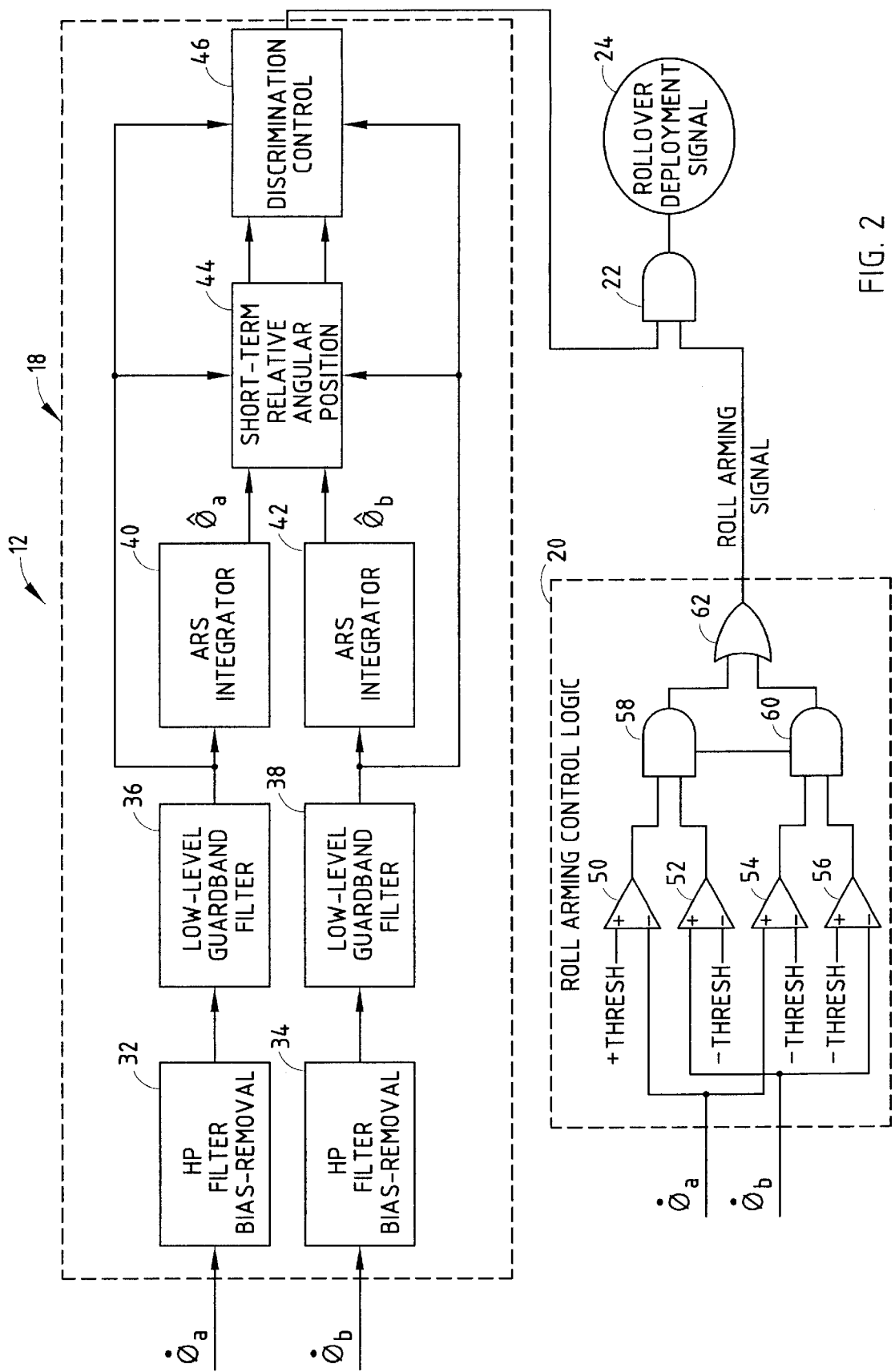
FIG. 2 is a block and circuit diagram further illustrating the vehicle rollover sensor of FIG. 1.

The rollover sensor 12 is further illustrated in greater detail in FIG. 2. The roll discrimination controller 18 includes first high pass (HP) filter bias-removal 32 and second high pass (HP) filter bias-removal 34 for receiving respective first and second sensed angular rate signals $\dot{\theta}_a$ and $\dot{\theta}_b$. The outputs of HP filters 32 and 34 are processed by first and second low-level guard band filters 36 and 38, respectively. The HP filters 32 and 34 eliminate bias and further reduce noise associated with the individual sensed angular rate signals. More particularly, the HP filters 32 and 34 remove constant and slowly-varying offset bias. The low-level guard band filters 36 and 38 remove small amplitude signals, thereby eliminating spurious noise and low-level non-rollover signals such as may occur while the vehicle is travelling on rough roads or during abusive vehicle driving conditions. An example of a combined high pass filter bias-removal and low-level guard band filter is disclosed in U.S. patent application Ser. No. 09/725,645, filed on Nov. 29, 2000, the disclosure of which is incorporated herein by reference.

The roll discrimination controller 18 also includes first and second ARS integrators 40 and 42 for integrating the processed angular rate signals $\dot{\theta}_a$ and $\dot{\theta}_b$ as output from HP filters 36 and 38, respectively. The first integrator 40 integrates first angular rate signal $\dot{\theta}_a$ to produce a first roll angle signal $\hat{\theta}_a$. The second integrator 42 likewise integrates the second angular rate signal $\dot{\theta}_b$ to produce a second roll angle $\hat{\theta}_b$.

Additionally, the roll discrimination controller 18 computes a short-term relative angular position 44 based on the first and second roll angles $\hat{\theta}_a$ and $\hat{\theta}_b$ and the first and second angular rate signals $\dot{\theta}_a$ and $\dot{\theta}_b$. The short-term relative angular position may be determined by determining the angular component from each roll angle that contributes to a rollover about the longitudinal axis 30. With the angular rate sensors 14 and 16 oriented at minus forty-five degrees (−45°) and minus one hundred thirty-five (−135°) degrees, respectively, the roll angle multiplier component about the longitudinal axis 30 for each sensed angular rate signal $\dot{\theta}_a$ and $\dot{\theta}_b$ is equal to approximately $\dot{\theta}_a$ cosine (−45) and $\dot{\theta}_b$ cosine (−135), respectively.

Finally, the roll discrimination controller 18 provides discrimination control 46 to determine whether or not the short-term relative angular position 44 is indicative of an anticipated rollover event. The discrimination control 46 may include comparing the short-term relative angular position 44 and the angular roll rate signals $\dot{\theta}_a$ and $\dot{\theta}_b$ to thresholds which are derived from a predetermined curve based on angular position and angular rate. According to one example, the angular position threshold may be set to approximately forty-five degrees (45°), while the angular rate threshold may be set to approximately one hundred degrees per second (100°/sec). However, it should be appreciated that the angular threshold and angular rate threshold values may vary depending on the roll characteristics of the vehicle.

In addition to discriminating an anticipated rollover event, the angular rate signals $\dot{\theta}_a$ and $\dot{\theta}_b$ are also employed to perform a roll arming function as provided in roll arming control logic 20. The roll arming logic 20 provides a certain amount of redundancy to the primary deployment path, such that a single point failure will not result in an inadvertent deployment. The roll arming control logic 20, as shown in FIG. 2, includes four comparators 50, 52, 54, and 56 for comparing the angular rate signals $\dot{\theta}_a$ and $\dot{\theta}_b$ with positive and negative angular rate thresholds. The four comparators 50–56 are configured such that rollover events about the vehicle longitudinal axis 30 will result in opposite polarities on the two angular rate sensor output signals $\dot{\theta}_a$ and $\dot{\theta}_b$. This reduces the probability that a single angular rate sensor failure could cause an inadvertent deployment activation. The roll arming control logic 20 further includes first and second logic AND gates 58 and 60, respectively, and a logic OR gate 62. While the roll arming signal is shown generated with control logic 20 having logic gates, it should be appreciated that the roll arming signal may otherwise be generated in a separate digital controller or generated by roll discrimination controller 18.

Figure 3:
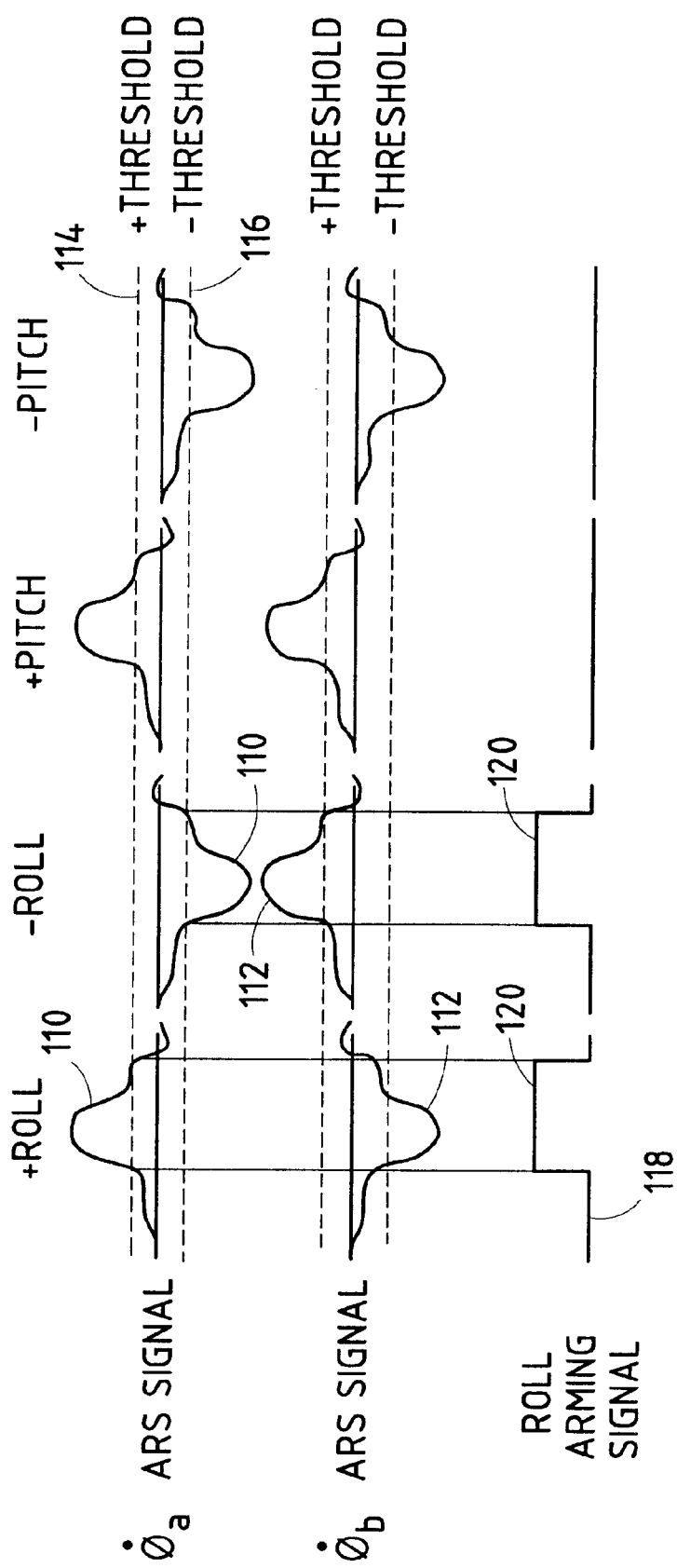
FIG. 3 is a graph illustrating the generation of a rollover arming signal as a function of sensed angular rate signals.

Referring briefly to FIG. 3, generation of the roll arming signal is further illustrated according to an example. When the first and second sensed angular rate signals $\dot{\theta}_a$ and $\dot{\theta}_b$ are of sufficient magnitudes 110 and 112 to exceed the positive (+) or negative (−) thresholds such that one angular rate signal has a positive signal amplitude and the other roll rate signal has a negative signal amplitude, the roll arming condition signal is generated as shown by pulse 120. Otherwise, the roll arming signal generates a low pulse 118, which prevents generation of the rollover deployment output signal 24.

Figure 4A:
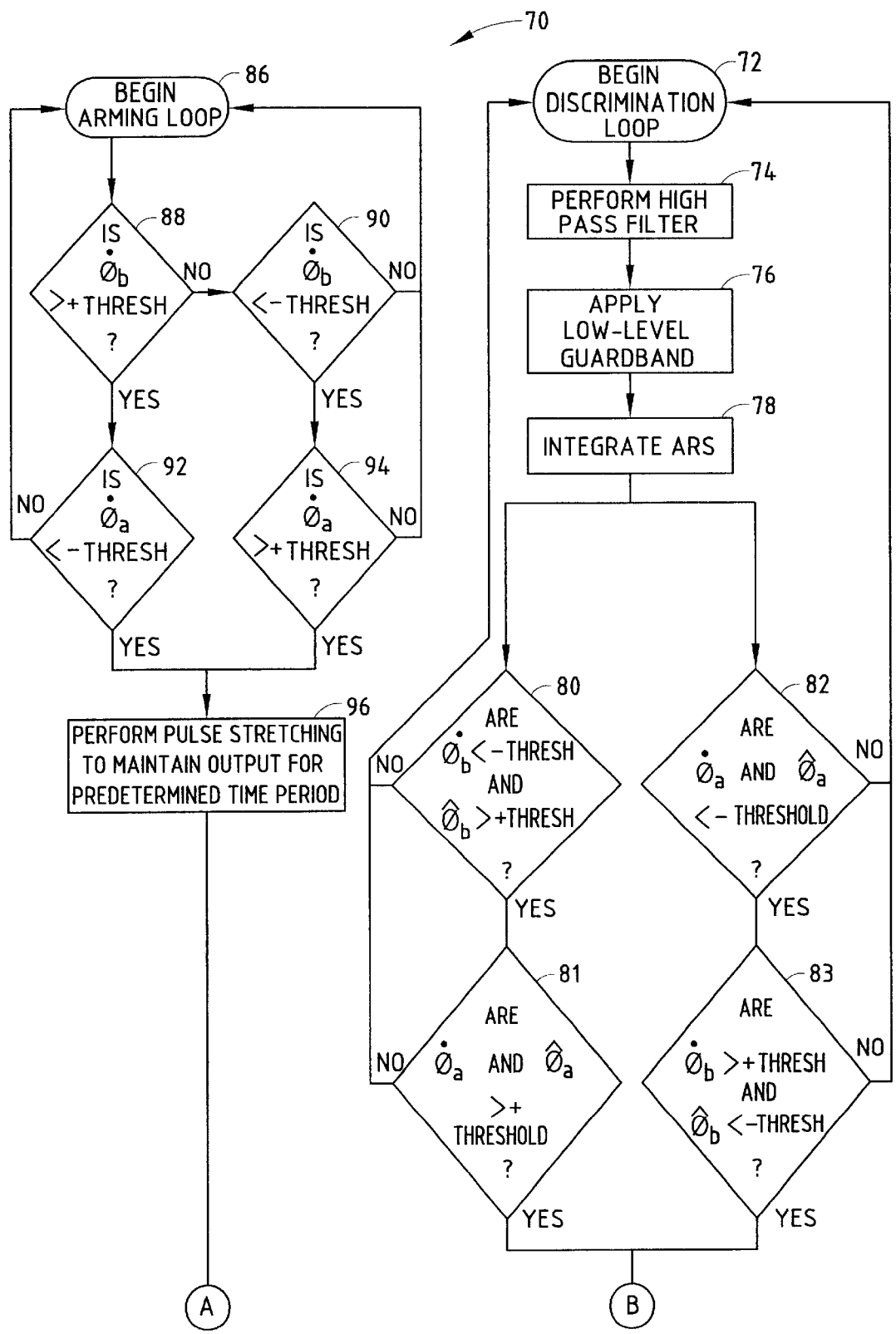
FIGS. 4A and 4B are a flow diagram illustrating a rollover sensing algorithm for detecting vehicle rollover with the rollover sensor of the present invention.
Figure 4B:
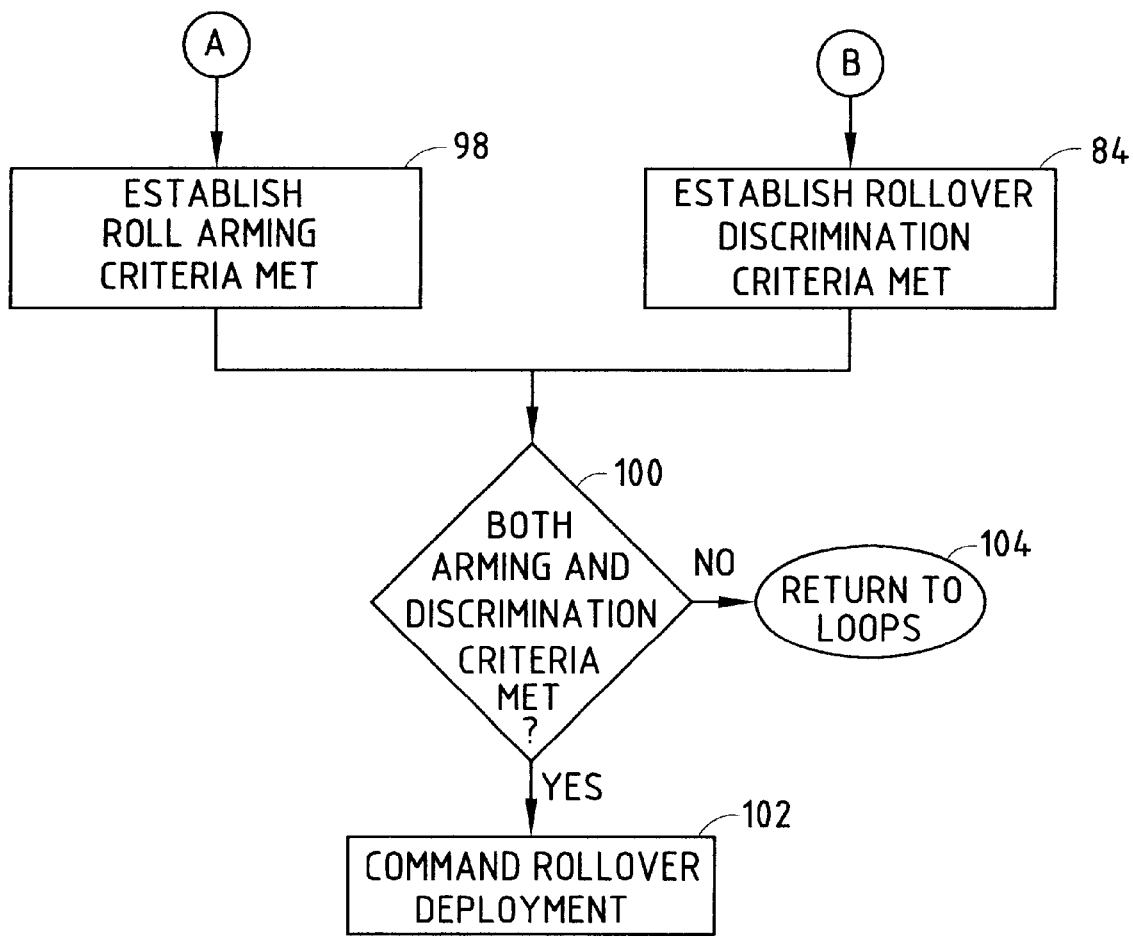

The operation of the rollover sensor 12 will now be described further in connection with rollover sensing methodology 70 illustrated in the flowchart in FIGS. 4A and 4B. The rollover sensing methodology 70 includes an arming loop beginning at step 86 and a discrimination loop beginning at step 72. In the discrimination loop, methodology 70 performs high pass filtering in step 74, and applies a low-level guardband, in step 76, for each of the sensed angular rate signals $\dot{\theta}_a$ and $\dot{\theta}_b$. In step 78, each of the angular rate signals $\dot{\theta}_a$ and $\dot{\theta}_b$ are integrated to produce the first and second roll angle signals $\hat{\theta}_a$ and $\hat{\theta}_b$. In decision step 80, the second angular rate signal $\dot{\theta}_b$ is compared to a negative threshold and the second roll angle signal $\hat{\theta}_b$ is compared to a positive threshold value. The negative and positive threshold values are derived from the predetermined curve. If the second angular rate signal $\dot{\theta}_b$ is less than the negative threshold and the second roll angle signal $\hat{\theta}_b$ is greater than the positive threshold, methodology 70 proceeds to step 81. Otherwise, methodology 70 returns to the beginning of the discrimination loop in step 72. In decision step 81, the first angular rate signal $\dot{\theta}_a$ and the first roll angle signal $\hat{\theta}_a$ are compared to positive thresholds. If the first angular rate signal $\dot{\theta}_a$ and the first roll angle signal $\hat{\theta}_a$ exceed the positive thresholds, methodology 70 proceeds to step 84 to establish that the rollover discrimination criteria has been met. Otherwise, methodology 70 returns to the beginning of the discrimination loop at step 72. In decisions step 82, methodology 70 compares the first angular rate signal $\dot{\theta}_a$ and the first roll angle signal $\hat{\theta}_a$ to negative thresholds. If the first angular rate signal $\dot{\theta}_a$ and the first roll angle signal $\hat{\theta}_a$ are less than the negative thresholds, methodology 70 proceeds to decision step 83. Otherwise, methodology 70 returns to the beginning of the discrimination loop in step 72. In decision step 83, the second angular rate signal $\dot{\theta}_b$ is compared to a positive threshold, and the second roll angle signal $\hat{\theta}_b$ is compared to a negative threshold. If the second angular rate signal $\dot{\theta}_b$ is greater than the positive threshold and the second roll angle signal $\hat{\theta}_b$ is less than the negative threshold, methodology 70 proceeds to step 84 to establish that the rollover discrimination criteria has been met. Otherwise, methodology 70 returns to the beginning of the discrimination loop in step 72. The preset thresholds for comparing with the first and second angular rate signals $\dot{\theta}_a$ and $\dot{\theta}_b$, and the preset thresholds for comparing the roll angles $\hat{\theta}_a$ and $\hat{\theta}_b$, are determined from the predetermined curve.

In the arming loop beginning at step 86, rollover sensing methodology 70 proceeds to decision step 88 to check if the second angular rate signal $\dot{\theta}_b$ exceeds a positive rate threshold, such as fifty degrees per second (50°/sec), and, if not, proceeds to decision step 90 to check if the second angular rate signal $\dot{\theta}_b$ is less than a negative rate threshold, such as negative fifty degrees per second (−50°/sec). If the second angular rate signal $\dot{\theta}_b$ is greater than the positive rate threshold, methodology 70 proceeds to decision 92 to check if the first angular rate signal $\dot{\theta}_a$ is less than the negative rate threshold and, if not, returns to the beginning of the roll arming loop in step 86. If decision steps 90 and 94 determine that either the second angular rate signal $\dot{\theta}_b$ is not less than the negative rate threshold or that the first angular rate signal $\dot{\theta}_a$ is not greater than the positive rate threshold, methodology 70 returns to the beginning of the roll arming loop at step 86. If the decisions in decision steps 92 or 94 are met, methodology 70 proceeds to perform pulse stretching to maintain the output signal at its current value for a predetermined time period in step 96. Thereafter, a roll arming criteria decision is met and established in step 98.

The rollover sensing methodology 70 compares both the roll arming signal and the rollover discrimination signal in steps 84 and 98 and, if both of these conditions are met, commands a rollover deployment in step 102. If either of the conditions in decision step 100 are not met, the rollover sensing methodology 70 returns to the arming and discrimination loops in step 104.

Accordingly, the rollover sensor 12 of the present invention provides accurate and timely rollover discrimination and roll arming by employing first and second angular rate sensors, without requiring costly auxiliary sensors, to provide rollover detection. of a vehicle. While angular rate sensors 14 and 16 are described herein arranged to sense angular roll rate about first and second orthogonal axes 15 and 17 at 45° and 135° counterclockwise from the longitudinal axis 30, it should be appreciated that the sensors 14 and 16 may otherwise be oriented to sense about different axes, counterclockwise or clockwise.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A rollover sensor for detecting an anticipated overturn condition for a vehicle, said sensor comprising:
    a first angular rate sensor for sensing attitude rate of change of a vehicle about a first axis and producing a first attitude rate of change signal indicative thereof;
    a second angular rate sensor for sensing attitude rate of change of the vehicle about a second axis and producing a second attitude rate of change signal indicative thereof, wherein the first and second angular rate sensors are oriented on the vehicle so that the first axis is different from the second axis; and
    a rollover discrimination controller for determining a vehicle overturn condition based on said first and second sensed attitude rate of change signals and providing an output signal indicative thereof, wherein the first and second angular rate sensors are angularly offset from a longitudinal axis and a lateral axis of the vehicle.

2. The rollover sensor as defined in claim 1, wherein said rollover discrimination controller comprises an integrator for integrating the first and second attitude rate of change signals and producing respective first and second attitude angles, and wherein the vehicle overturn condition is determined further as a function of the first and second attitude angles.

3. The rollover sensor as defined in claim 1, wherein said first and second angular rate sensors are oriented such that the first axis is substantially orthogonal to the second axis.

4. The rollover sensor as defined in claim 3, wherein the first axis is oriented at an angle of approximately forty-five degrees (45°) relative to a longitudinal axis of the vehicle, and said second axis is oriented at approximately one hundred thirty-five degrees (135°) relative to the longitudinal axis of the vehicle.

5. The rollover sensor as defined in claim 1, wherein said rollover sensor determines a rollover condition of said vehicle about a longitudinal axis of the vehicle.

6. The rollover sensor as defined in claim 1, wherein said rollover sensor determines a pitchover condition of said vehicle about a lateral axis of the vehicle.

7. A rollover sensor for detecting an anticipated overturn condition for a vehicle, said sensor comprising:
    a first angular rate sensor for sensing attitude rate of change of a vehicle about a first axis and producing a first attitude rate of change signal indicative thereof;
    a second angular rate sensor for sensing attitude rate of change of the vehicle about a second axis and producing a second attitude rate of change signal indicative thereof, wherein the first and second angular rate sensors are oriented on the vehicle so that the first axis is different from the second axis;
    a rollover discrimination controller for determining a vehicle overturn condition based on said first and second sensed attitude rate of change signals and providing an output signal indicative thereof; and
    arming control logic receiving said first and second attitude rate of change signals and determining a roll arming signal based on said first and second sensed attitude rate of change signals, wherein said vehicle overturn condition signal is determined further as a function of said roll arming signal.

8. The rollover sensor as defined in claim 7, wherein said arming control logic generates the roll arming signal when the first sensed attitude rate of change signal is positive and exceeds a first predetermined threshold and the second sensed attitude rate of change signal is negative and is below a second predetermined threshold.

9. The rollover sensor as defined in claim 7 further comprising a logic AND gate for receiving the discrimination controller output signal and the roll sensing signal and providing a vehicle overturn deployment signal.

10. A rollover sensor for detecting an anticipated overturn condition for a vehicle, said sensor comprising:
   a first angular rate sensor for sensing attitude rate of change of a vehicle and producing a first attitude rate of change signal;
   a second angular rate sensor for sensing attitude rate of change of the vehicle and producing a second attitude rate of change signal;
   roll arming control logic for receiving the first and second attitude rate of change signals and determining a roll arming signal as a function of the first and second attitude rate of change signals; and
   a rollover discrimination controller for generating a vehicle overturn condition signal as a function of the first and second attitude rate of change signals and the roll arming signal.

11. The rollover sensor as defined in claim 10, wherein said rollover discrimination controller comprises an integrator for integrating the first and second attitude rate of change signals and producing first and second attitude angles, wherein the vehicle overturn condition signal is determined further as a function of the first and second attitude angles.

12. The rollover sensor as defined in claim 10, wherein the first and second angular rate sensors are oriented on the vehicle so as to sense angular rate of change signals along different axes.

13. The rollover sensor as defined in claim 12, wherein the first angular rate sensor is oriented substantially orthogonal to the second angular rate sensor.

14. The rollover sensor as defined in claim 13, wherein the first angular rate sensor senses about a first axis oriented at an angle of approximately forty-five degrees (45°) relative to a longitudinal axis of the vehicle and the second angular rate sensor about a second axis oriented at an angle of approximately one hundred thirty-five degrees (135°) relative to the longitudinal axis of the vehicle.

15. The rollover sensor as defined in claim 10, wherein said rollover sensor determines a rollover condition of said vehicle about a longitudinal axis of the vehicle.

16. The rollover sensor as defined in claim 10, wherein said rollover sensor determines a pitchover condition of said vehicle about a lateral axis of the vehicle.

17. The rollover sensor as defined in claim 10, wherein the first and second angular rate sensors are angularly offset from a longitudinal axis and a lateral axis of the vehicle.

18. A rollover sensor for detecting an anticipated roll event, said rollover sensor comprising:
   a first angular rate sensor for sensing attitude rate of change of a vehicle about a first axis and producing a first attitude rate of change signal indicative thereof;
   a second angular rate sensor for sensing attitude rate of change of a vehicle about a second axis and producing a second attitude rate of change signal indicative thereof, wherein the first and second angular rate sensors are located on the vehicle and arranged so that the first axis is different from the second axis; and
   a rollover discrimination controller including an integrator for integrating the first and second attitude rate of change signals and producing first and second attitude angles, said controller further determining a vehicle overturn condition based on said first and second sensed attitude rate of change signals and said first and second attitude angles and providing an output signal indicative thereof, wherein the first and second angular rate sensors are angularly offset from a longitudinal axis and a lateral axis of the vehicle.

19. The rollover sensor as defined in claim 18 further comprising roll arming control logic for receiving the first and second sensed attitude rate of change signals and determining a roll arming signal as a function of the first and second attitude rate of change signals.

20. The rollover sensor as defined in claim 18, wherein said first and second angular rate sensors are oriented such that the first axis is substantially orthogonal to the second axis.

21. A method of detecting an anticipated overturn condition of a vehicle, said method comprising the steps of:
   sensing attitude rate of change of a vehicle about a first axis and producing a first attitude rate of change signal indicative thereof;
   sensing attitude rate of change of the vehicle about a second axis and producing a second attitude rate of change signal indicative thereof, wherein the first axis is different from the second axis; and
   determining a vehicle overturn condition based on said first and second sensed attitude rate of change signals, wherein the first axis and second axis are angularly offset from a longitudinal axis and a lateral axis of the vehicle.

22. The method as defined in claim 19 further comprising the step of integrating the first and second attitude rate of change signals and producing first and second attitude angles, wherein the vehicle overturn condition is determined further as a function of the first and second attitude angles.

23. The method as defined in claim 19, wherein the first axis is substantially orthogonal to the second axis.

24. The method as defined in claim 23, wherein the first axis is oriented at an angle of approximately forty-five degrees relative to a longitudinal axis of the vehicle, and said second axis is oriented at approximately one hundred thirty-five degrees relative to the longitudinal axis of the vehicle.

25. The method as defined in claim 19, wherein said overturn condition is a rollover condition of the vehicle about a longitudinal axis of the vehicle.

26. A method of detecting an anticipated overturn condition of a vehicle, said method comprising the steps of:
   sensing attitude rate of change of a vehicle about a first axis and producing a first attitude rate of change signal indicative thereof;
   sensing attitude rate of change of the vehicle about a second axis and producing a second attitude rate of change signal indicative thereof, wherein the first axis is different from the second axis;
   determining a vehicle overturn condition based on said first and second sensed attitude rate of change signals; and
   determining a roll arming signal based on the first and second sensed attitude rate of change signals, wherein the vehicle overturn condition is determined further as a function of said roll arming signal.

27. The method as defined in claim 26, wherein the roll arming signal is generated when the first sensed attitude rate of change signal is positive and exceeds a first predetermined threshold and the second sensed attitude rate of change signal is negative and is below a second predetermined threshold.

* * * * *